US011619504B2

(12) United States Patent
Li

(10) Patent No.: US 11,619,504 B2
(45) Date of Patent: Apr. 4, 2023

(54) TRANSPORTATION ARRANGEMENT SYSTEM UTILIZING ARTIFICIAL INTELLIGENCE

(71) Applicant: International Business Machines Corporation, Armonk, NY (US)

(72) Inventor: Qiang Li, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 16/676,758

(22) Filed: Nov. 7, 2019

(65) Prior Publication Data

US 2021/0140776 A1 May 13, 2021

(51) Int. Cl.
*G01C 21/34* (2006.01)
*G01C 21/36* (2006.01)
*G05D 1/00* (2006.01)
*G08G 1/00* (2006.01)

(52) U.S. Cl.
CPC ..... *G01C 21/3438* (2013.01); *G01C 21/3484* (2013.01); *G01C 21/3605* (2013.01); *G05D 1/0088* (2013.01); *G08G 1/202* (2013.01); *G05D 2201/0213* (2013.01)

(58) Field of Classification Search
CPC ............ G01C 21/3438; G01C 21/3484; G01C 21/3605; G05D 1/0088; G05D 2201/0213; G08G 1/202; G06Q 10/06315; G06Q 50/30; G06Q 10/025; G06Q 30/0207
See application file for complete search history.

(56) References Cited

U.S. PATENT DOCUMENTS 8,285,571 B2 * 10/2012 Demirdjian ............ G06Q 50/01
705/6
2015/0006072 A1 1/2015 Goldberg et al.
2015/0248689 A1 9/2015 Paul et al.
(Continued)

FOREIGN PATENT DOCUMENTS

CN 105678485 A 6/2016

OTHER PUBLICATIONS

Melis et al., "Public Transportation, IoT, Trust and Urban Habits", Conference Paper, Sep. 2016, 9 pages. https://www.researchgate.net/profile/Andrea_Melis4/publication/306525703_Public_Transportation_IoT_Trust_and_Urban_Habits/links/5b21470b458515270fc6cece/Public-Transportation-IoT-Trust-and-Urban-Habits.pdf?origin=publication_detail.
(Continued)

*Primary Examiner* — Rami Khatib
(74) *Attorney, Agent, or Firm* — Jeffrey M. Ingalls

(57) ABSTRACT

A method, computer system, and computer program product for arranging transportation are provided. The method includes analyzing a first set of data by one or more processors to predict transportation demands of a passenger, and includes analyzing a second set of data by the one or more processors to determine a supply of vehicles in a transportation system. The method also includes generating, by the one or more processors, a transportation offer based on the predicted transportation demands of the passenger and the supply of vehicles. The method includes transmitting the transportation offer to the passenger and the transportation system. Upon receiving an acceptance of the offer by at least the passenger, the method further includes creating a transportation arrangement between the passenger and the transportation system.

16 Claims, 7 Drawing Sheets

(56) References Cited

U.S. PATENT DOCUMENTS

| | | | |
|---|---|---|---|
| 2017/0147951 A1* | 5/2017 | Meyer | G06Q 50/14 |
| 2018/0121847 A1* | 5/2018 | Zhao | G06Q 10/06312 |
| 2018/0259976 A1 | 9/2018 | Williams et al. | |
| 2018/0300709 A1* | 10/2018 | Singhai | G06Q 50/30 |
| 2019/0102858 A1* | 4/2019 | Pivnick | G01C 21/3484 |
| 2019/0206009 A1* | 7/2019 | Gibson | G06Q 10/06315 |
| 2019/0236742 A1* | 8/2019 | Tomskii | G06Q 50/30 |
| 2021/0042668 A1* | 2/2021 | Gao | G06Q 50/30 |
| 2021/0142248 A1* | 5/2021 | Balva | G06Q 10/06315 |
| 2021/0142373 A1* | 5/2021 | Takahara | G06Q 50/10 |
| 2021/0150420 A1* | 5/2021 | Hurley | G06Q 50/30 |

OTHER PUBLICATIONS

Nuaimi et al., "Applications of big data to smart cities", Journal of Internet Services and Applications, 2015, 15 pages. https://jisajournal.springeropen.com/track/pdf/10.1186/s13174-015-0041-5.

Agatz et al., "Optimization for dynamic ride-sharing: A review", European Journal of Operational Research, vol. 223, Issue 2, Dec. 1, 2012, Abstract Only, 1 page. https://www.sciencedirect.com/science/article/abs/pii/S0377221712003864.

* cited by examiner

| Trip | Date | Time Range | Day of Week | GPS Origin | GPS Destination |
|---|---|---|---|---|---|
| 1 | Date 1 | T1 to T2 | Mon | L1 (home) | L2 (work) |
| 2 | Date 2 | T1 to T2 | Tue | L1 (home) | L2 (work) |
| 3 | Date 2 | T3 to T4 | Tue | L2 (work) | L1 (home) |
| 4 | Date 3 | T1 to T2 | Wed | L1 (home) | L2 (work) |
| 5 | Date 4 | T1 to T2 | Thu | L1 (home) | L2 (work) |
| 6 | Date 4 | T3 to T4 | Thu | L2 (work) | L1 (home) |
| 7 | Date 4 | T5 to T6 | Thu | L1 (home) | L4 (grocery store) |
| 8 | Date 5 | T6 to T7 | Thu | L4 (grocery store) | L3 (gym) |
| 9 | Date 6 | T1 to T2 | Fri | L1 (home) | L2 (work) |
| 10 | Date 7 | T3 to T4 | Fri | L2 (work) | L1 (home) |
| 11 | Date 8 | T5 to T6 | Sat | L5 (coffee shop) | L6 (airport) |
| 12 | Date 8 | T7 to T8 | Sat | L7 (2nd airport) | L8 (hotel) |
| 13 | Date 10 | T9 to T10 | Sun | L6 (airport) | L1 (home) |

| Time Range | Description | Days of Week | GPS Origin | GPS Destination |
|---|---|---|---|---|
| T1 to T2 | Go to Work | Mon/Tue/Wed/Thu/Fri | L1 (home) | L2 (work) |
| T3 to T4 | Come Home From Work | Tue/Thu/Fri | L2 (work) | L1 (home) |
| T5 to T6 | To Grocery Store | Thu | L1 (home) | L4 (grocery store) |
| T5 to T6 | Go to Airport | Sat | L5 (coffee shop) | L6 (airport) |
| T6 to T7 | Go to the Gym | Thu | L4 (grocery store) | L3 (gym) |
| T7 to T8 | Airport to Hotel | Sat | L7 (2nd airport) | L8 (hotel) |
| T9 to T10 | Airport to Home | Sun | L6 (airport) | L1 (home) |

TRANSPORTATION ARRANGEMENT SYSTEM UTILIZING ARTIFICIAL INTELLIGENCE

BACKGROUND

Related transportation arrangement systems rely on vehicles having a driver, and also rely on passengers that input a desired destination. In certain systems, a passenger makes a request for transportation to a location, and the transportation arrangement system creates an offer that is presented to a plurality of drivers within a vehicle fleet. The drivers can review the passenger's offer and accept the offer if they so choose. This requires active input by both the passengers and the drivers. Furthermore, related transportation systems that utilize a vehicle having a driver require the passengers and the vehicle fleet to enter data into a common centralized computing system to arrange transportation. With related driver-based transportation systems, there are limitations such as efficiency, time and effort required to arrange a ride, costs, reliability, the inability to arrange transportation utilizing multiple vehicles for different portions of a trip, and a need for both the passengers and the drivers of the vehicle fleet to enter data into a common centralized server to determine a possible match between supply and demand.

SUMMARY

The present disclosure relates generally to creating transportation arrangements between driverless vehicles and passengers based on artificial intelligence ("AI"). In particular, the present disclosure relates to creating transportation arrangements between driverless vehicles and passengers based on passenger data, and supply and demand data within a transportation system, utilizing one or more artificial intelligence systems.

In certain embodiments, a method for arranging transportation between a passenger and a transportation system is provided. The method includes analyzing a first set of data by one or more processors to predict transportation demands of a passenger, and the method includes analyzing a second set of data by the one or more processors to determine a supply of vehicles in a transportation system. The method also includes generating, by the one or more processors, a transportation offer based on the predicted transportation demands of the passenger and the supply of vehicles. The method includes transmitting the transportation offer to the passenger and the transportation system. Upon receiving an acceptance of the offer by at least the passenger, the method further includes creating a transportation arrangement between the passenger and the transportation system.

Other embodiments of the present disclosure are directed to a computer system and computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

FIG. 5 is a table showing one example of historical travel data of a passenger.

FIG. 6 is a table showing one example of travel trends for a passenger that is based on the historical travel data shown in FIG. 5.

DETAILED DESCRIPTION

Figure 1:
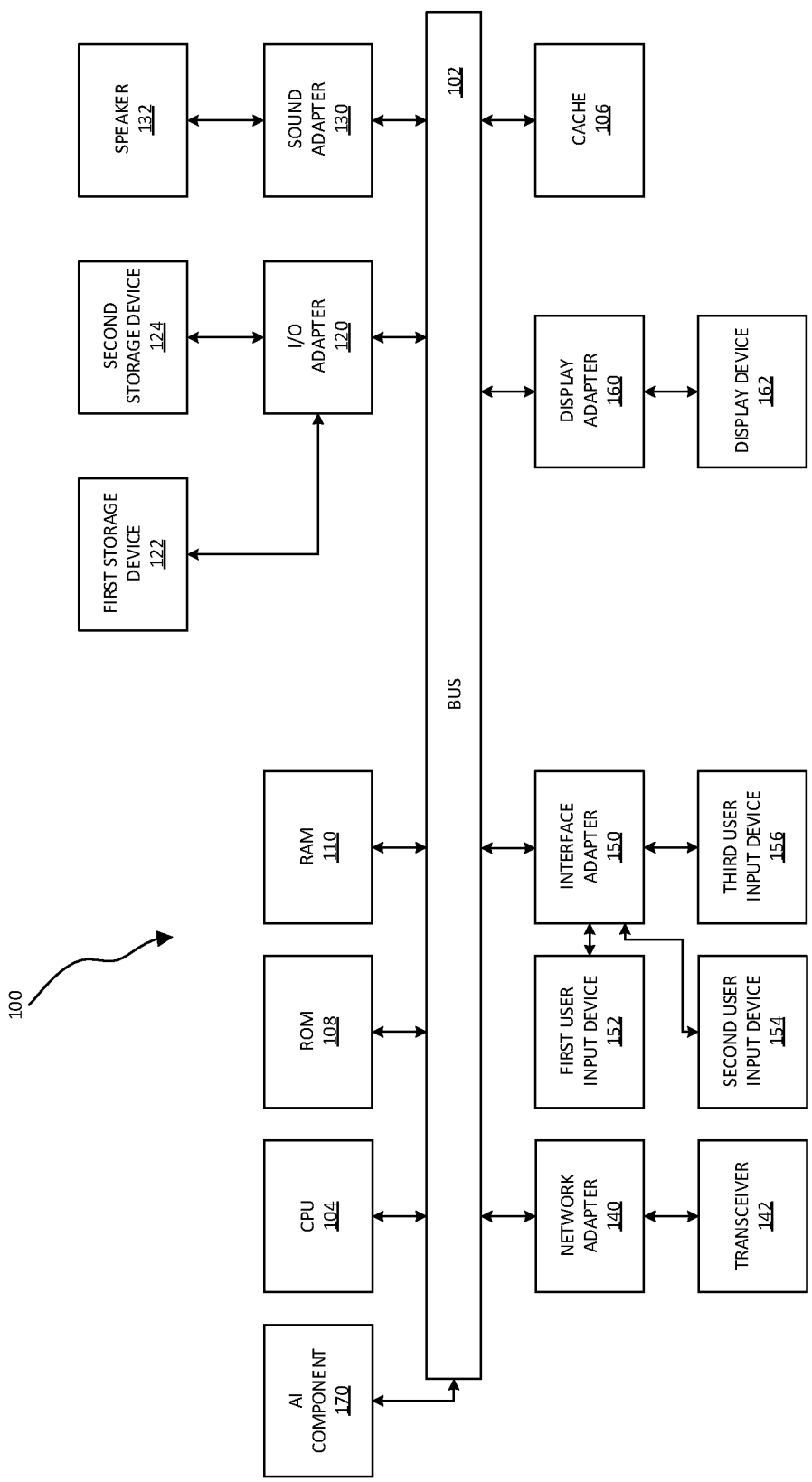
FIG. 1 depicts a block diagram of a processing system, according to embodiments.

The embodiments described herein provide for systems, methods and computer program products that use Big Data and Artificial Intelligence (AI) to facilitate transportation arrangements between passengers and vehicles. In certain embodiments, the transportation arrangements are based on AI systems that model passenger needs and driverless vehicle availability. In these embodiments, the transportation arrangement system generates matching offers based on this data, and then presents these offers to at least one of the passengers and a transportation network including the driverless vehicles. If both the passenger and the transportation network accept the matching offer, then the transportation arrangement system creates the transportation arrangement.

Machine learning, which is a subset of AI, utilizes algorithms to learn from data (e.g., Big Data) and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data, visual recognition, and natural language processing to solve problems and optimize processes.

As used herein, "Big Data" refers to data that is characterized, in part, by large volumes of data (e.g., terabytes, petabytes, etc. in size), a large variety of data (e.g., including structured data, unstructured data, etc.), and different sources of data, etc. An example of structured data is transactional data in a relational database. Examples of unstructured data include images, email data, sensor data, etc. Some examples for sources of Big Data include banking information, travel information, medical records, geographical information, transportation system data, passenger data, etc.

As used herein, a "Smart City" generally refers to a metropolitan area that utilizes different types of Big Data, and is collected from a variety of citizens, electronic Internet of Things (IoT) sensors, and other devices. The information is processed and analyzed to monitor and manage different aspects of metropolitan infrastructure such as traffic and transportation systems, power plants, water supply networks, waste management, police and fire departments, information systems, schools, libraries, hospitals, community services, etc. The data may be used to optimize the efficiency of city operations and services, such as the transportation systems that include the driverless vehicle fleets discussed herein.

As used herein, "navigation" is defined as the process of planning a route or directing travel of an object. A global positioning system (GPS) is a navigational system that uses satellite signals to determine latitude and longitude of a receiver on Earth. The GPS has evolved in recent years, and it is commonly found in land vehicles and smartphone devices. Most current GPS systems utilize a visual display to present a map, a position on the map, and in some circumstances, directions associated with a requested navigation query. GPS systems are commonly employed to provide directions from a start location to an end location. The directions may be output through an interface, or in some configurations a microphone. The visual display is utilized to present one or more images directed at the navigation. In the event there is a deviation from the generated route, instructions are re-calculated and/or re-generated based on changes in position and associated position data. In the present embodiments, navigational systems such as a GPS system can be used in conjunction with the transportation arrangement systems discussed herein to determine and optimize passenger and vehicle fleet routes from an origin to a destination.

Regarding the passengers of the driverless vehicles discussed herein, Big Data may include information about past transportation usage patterns, and historical location information of passengers. Past transportation usage patterns include data about where certain passengers have traveled to and from, and when they travelled. This may include GPS location data with timestamp information reflecting origin and destination locations, as well as the distances travelled between origin and destination. The data of the past transportation usage patterns may also include information regarding the type (or mode) of transportation (e.g., personal car, taxicab, train, plane etc.) that was used. The data may also include timestamp data showing when a passenger departed from a specific location, and when a passenger arrived at a specific location.

Big Data location information for a passenger may include historical information regarding where the passenger was at a given time, without regard to where the passenger was travelling to or from. For example, if a passenger was at a grocery store at 7:00 am, the data may include information such as the GPS coordinates of the location, the name of the store, the address, the cross streets, and any other suitable metadata data associated with the location.

Also, the Big Data for the passenger may include individual profile information, such as the time the passenger normally wakes up or falls asleep, and what the time the passenger leaves for work or comes home from work, and what days of the week the passenger works, etc. In certain embodiments, the passenger can specify what types of personal information they would like to share or keep private with the transportation arrangement system.

For passengers, the transportation arrangement system applies artificial intelligence models to the passenger Big Data to predict where they are likely to be travelling next. That is, from the data, the transportation system is able to identify patterns in passenger travel behavior that allows the system to predict future travel needs. These predictions lessen or eliminate the need for the passenger to manually input their desired destination information. Thus, compared to related transportation systems, it is more efficient and requires less effort from the standpoint of the user. In certain embodiments, if the prediction does not match the actual next desired destination of the passenger, the passenger has the option to override the predicted next destination, or to simply reject (or ignore) an offer of transportation.

In certain embodiments, regarding a driverless vehicle fleet in a Smart City, a transportation management system that controls the vehicle fleet applies artificial intelligence models to the Big Data to optimize where and when the vehicles should be operated, and to determine the demand level for vehicles at particular times and locations. These locations may be based on population movements, past customer demand, local events (e.g., concerts, or sporting events), historical trends, the time of day, the day of the week, the season the year, the weather, etc. Thus, Big Data can be used to determine the demand for vehicles at different locations and at different times. In certain embodiments, the driverless vehicle includes an onboard artificial intelligence system that can process Big Data. In other embodiments, the artificial intelligence system is on one or more computing systems that are separate from the vehicle.

Thus, as described above, Big Data is the raw input of large amounts of varied information. This Big Data may be gathered with respect to the passengers, and with respect to a driverless vehicle fleet. In certain embodiments, an AI-enabled computing system analyzes and interprets both sets of Big Data with computing models to determine output that aids in arranging transportation between the passengers and the driverless vehicles.

Referring now to the drawings in which like numerals represent the same or similar elements and initially to FIG. 1, an exemplary processing system 100 to which the present embodiments may be applied is shown in accordance with one embodiment. The processing system 100 includes at least one processor (CPU) 104 operatively coupled to other components via a system bus 102. A cache 106, a Read Only Memory (ROM) 108, a Random-Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 may be any of a disk storage device (e.g., a magnetic or optical disk storage device), a solid-state magnetic device, and so forth. The storage devices 122 and 124 may be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 may be any of a keyboard, a mouse, a keypad, an image capture device, a motion sensing device, a microphone, a device incorporating the functionality of at least two of the preceding devices, or any other suitable types of input devices. The user input devices 152, 154, and 156 may be the same type of user input device or different types of user input devices. The user input devices 152, 154, and 156 are used to input and output information to and from system 100. In certain embodiments, an artificial intelligence (AI) component 170 is operatively coupled to system bus 102.

The processing system 100 may also include other elements (not shown), as readily contemplated by one of skill in the art, as well as omit certain elements. For example, various other input devices and/or output devices may be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present disclosure provided herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure that includes a network of interconnected nodes.

Figure 2:
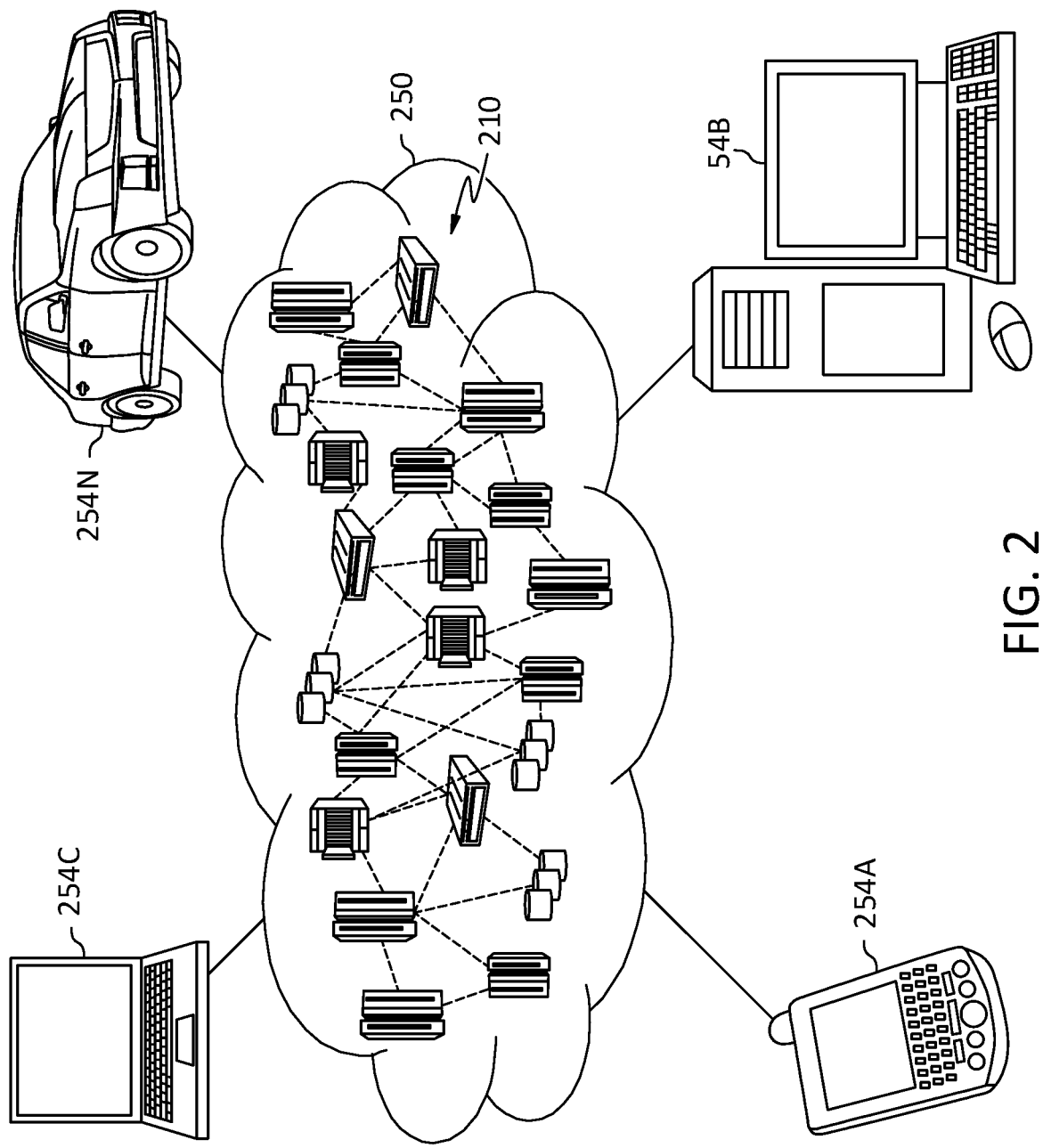
FIG. 2 is a block diagram of an illustrative cloud computing environment having one or more computing nodes with which local computing devices used by cloud customers to communicate, according to embodiments.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of netwo9+8rk and/or network addressable connection (e.g., using a web browser).

Figure 3:
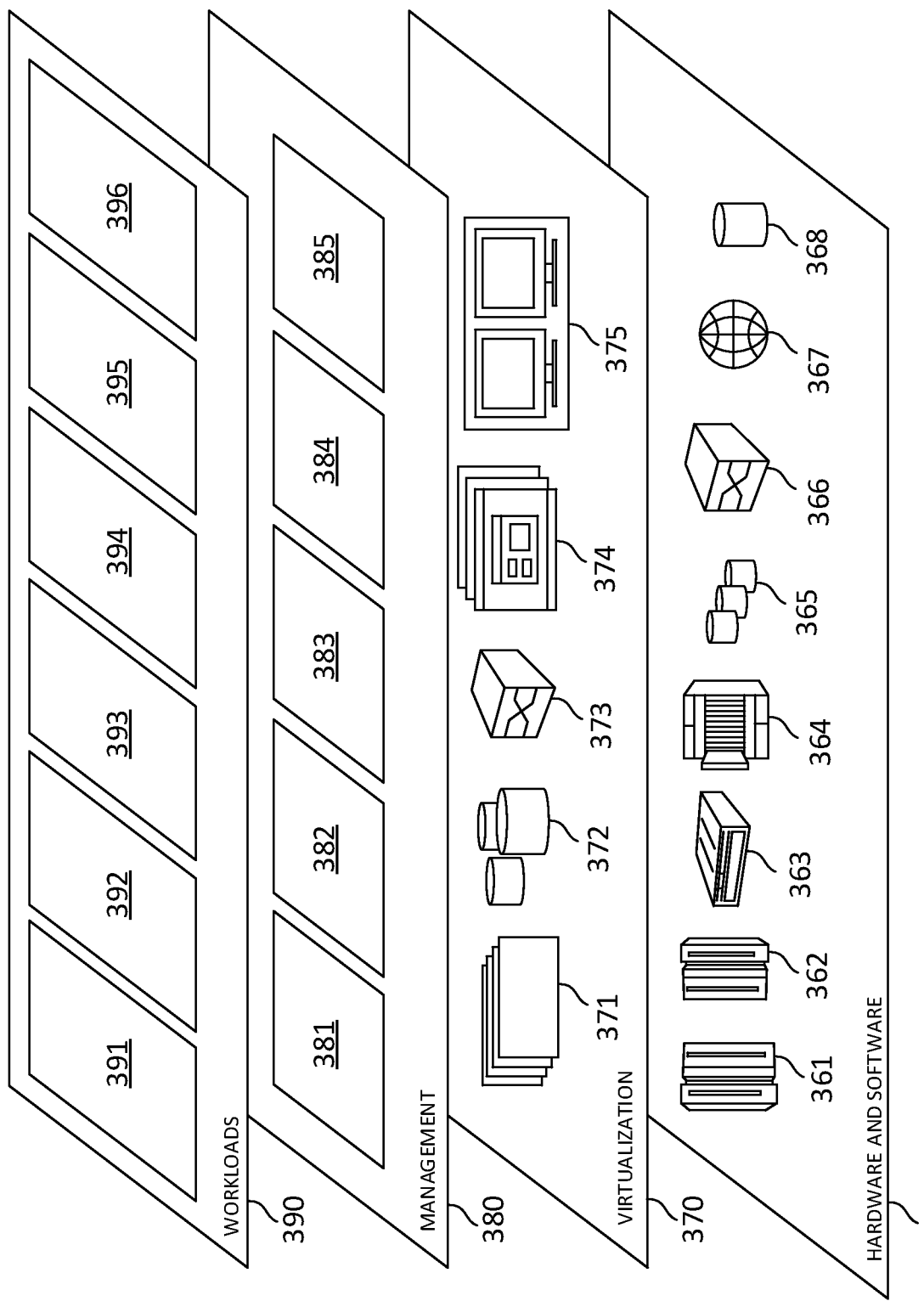
FIG. 3 is a block diagram of a set of functional abstraction layers provided by a cloud computing environment, according to embodiments.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and artificial intelligence-based transportation arrangement processing 396.

Figure 4:
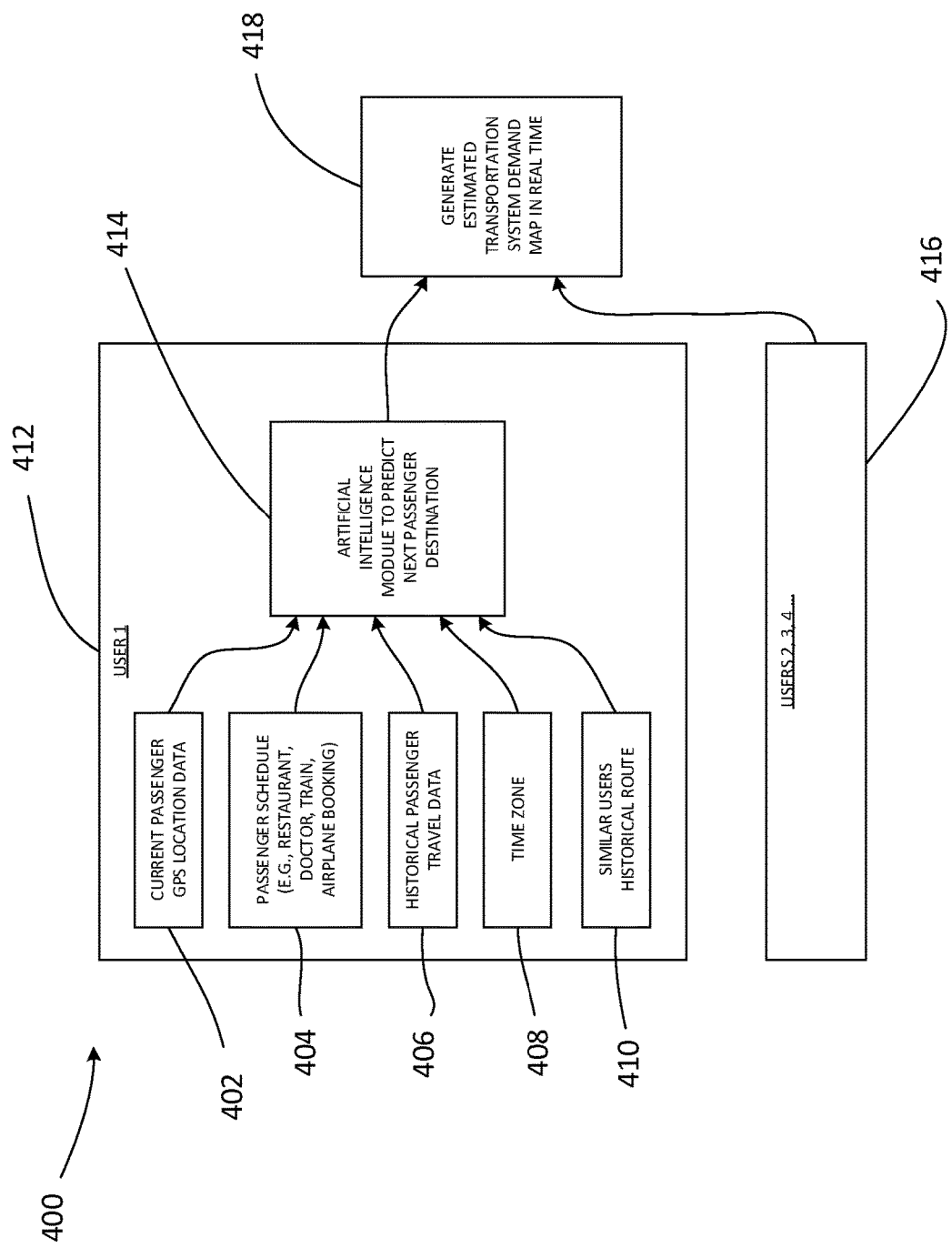
FIG. 4 is a block diagram of a transportation arrangement system using passenger data to generate a predicted next destination for a passenger, and to generate a real time system demand map.

Referring now to FIG. 4, in certain embodiments, the transportation arrangement system 400 utilizes passenger-based Big Data to generate an estimated demand for the entire transportation system. For a first passenger (or user) 412, the transportation arrangement system 400 utilizes passenger data such as current passenger GPS location data 402, a passenger schedule 404 (e.g., restaurant bookings, doctor appointments, train bookings, airplane bookings, etc.), historical passenger travel data 406, a passenger's current time zone 408, historical route information for other passengers 416 having similar travel patterns 410, and any other suitable type of passenger travel information. Although several examples of passenger data are shown in FIG. 4, it should be appreciated that the transportation arrangement system 400 can utilize any other suitable type of data relating to a passenger or a passenger's travel habits. As shown in FIG. 4, all of this data is processed by an artificial intelligence module 414 (see also, AI component 170 in FIG. 1) to predict what the passengers next destination is likely to be. The same information is processed for a plurality of other passengers 416. For the passenger 412 and the other passengers 416, the predicted next destinations are output to the transportation arrangement system 400. Thus, the transportation arrangement system 400 has an overall view for all of the passengers in the system as to what the likely demand for transportation will be at a given point in time. This includes where passengers are at (or are likely to be at), and where the passengers are likely to be travelling to next.

In one example, a first passenger has a job at a particular location, and regularly requests transportation from a first origin location to a first destination location at a given time every morning (e.g., 7:00 am). In this example, a second passenger also has a job at a particular location, and regularly requests transportation from a second origin location to a first destination location at a given time every morning (e.g., 7:10 am). If the first and second origins locations are near to each other, and the first and second destination locations are near to each other, and because the departure times for the first and second passengers are close to one another, the transportation arrangement system 400 may determine that there is a relatively large transportation demand at those places and times. In this case, the transportation arrangement system 400 may update the system demand map 418 in real time to account for this demand, and may cause a greater supply of driverless vehicles to be directed toward the vicinity of the origin location to account for this potential demand. It should be appreciated that although the transportation arrangement system 400 is predicting that the passengers will travel to and from a given location at a given time based on the analysis of the passenger data (e.g., 402, 404, 406, 408 and 410), the passengers may not actually request travel arrangements.

As discussed above, in certain embodiments, the transportation arrangement system utilizes historical passenger travel data 406 to aid in predicting a next destination of the passenger. Referring now to FIG. 5, this chart shows one nonlimiting example of a type of historical route data 500 of a passenger that may be utilized. As shown in FIG. 5, there are thirteen occasions when the passenger has used a driverless vehicle to get from one location to another. The data includes the date of travel, the time range of travel, a day of the week for travel, and GPS origin and destination information. For example, for Trip 1, the passenger travelled on Date 1 which was a Monday, during a time range of T1 to T2 (e.g., 7:00-8:00 am), and the passenger travelled from home to work. It should be appreciated that FIG. 5 is not limiting of the type or amount of data that can be utilized, and other types of historical data could be utilized. For example, the transportation arrangement may include other information associated with the GPS coordinates, such as street addresses, zip codes, cities, states, names of building or businesses at the location, etc. The date could also include exact time of departure, and exact time of arrival rather than that the travel occurred in a particular time range. Also, the time range could be, for example, a particular hour of the day, an afternoon period, late evening, rush hour, etc. It is from this raw data that the transportation arrangement system utilizes the AI module to determine trends and to attempt to predict future transportation needs of the passengers located within the transportation network.

Referring now to FIG. 6, this table 600 shows one nonlimiting example of how the transportation arrangement system has analyzed the data from the table in FIG. 5 to determine trends. For example, the passenger travelled from home to work consistently between the hours of T1 to T2 every weekday (Monday through Friday). However, going home from work the passenger only traveled on Tuesday, Thursday and Friday between the hours of T3 to T4. From this data, the transportation arrangement system may be able to identify a trend of travelling from home to work in the mornings, and then automatically generate an offer to the passenger based on this data. For example, on any given Monday, the transportation arrangement system would generate a notification to the user at time T1, and also provide an offer of transportation. By having the transportation arrangement system automatically provide the offer to the passenger, this has the effect of alleviating the need for the passenger to request transportation at this particular time. As discussed in further detail below, the passenger can review the offer, and either accept it, modify it, or reject it.

In certain embodiments, if the passenger reviews the offer and rejects is (or doesn't respond to the offer), the transportation arrangement system determines whether there are additional passengers that may have similar needs. If the transportation system determines that there are other passengers with a potential travel need, they can transmit the offer to one or more additional passengers, and these passengers then have the option to accept the offer.

Figure 7:
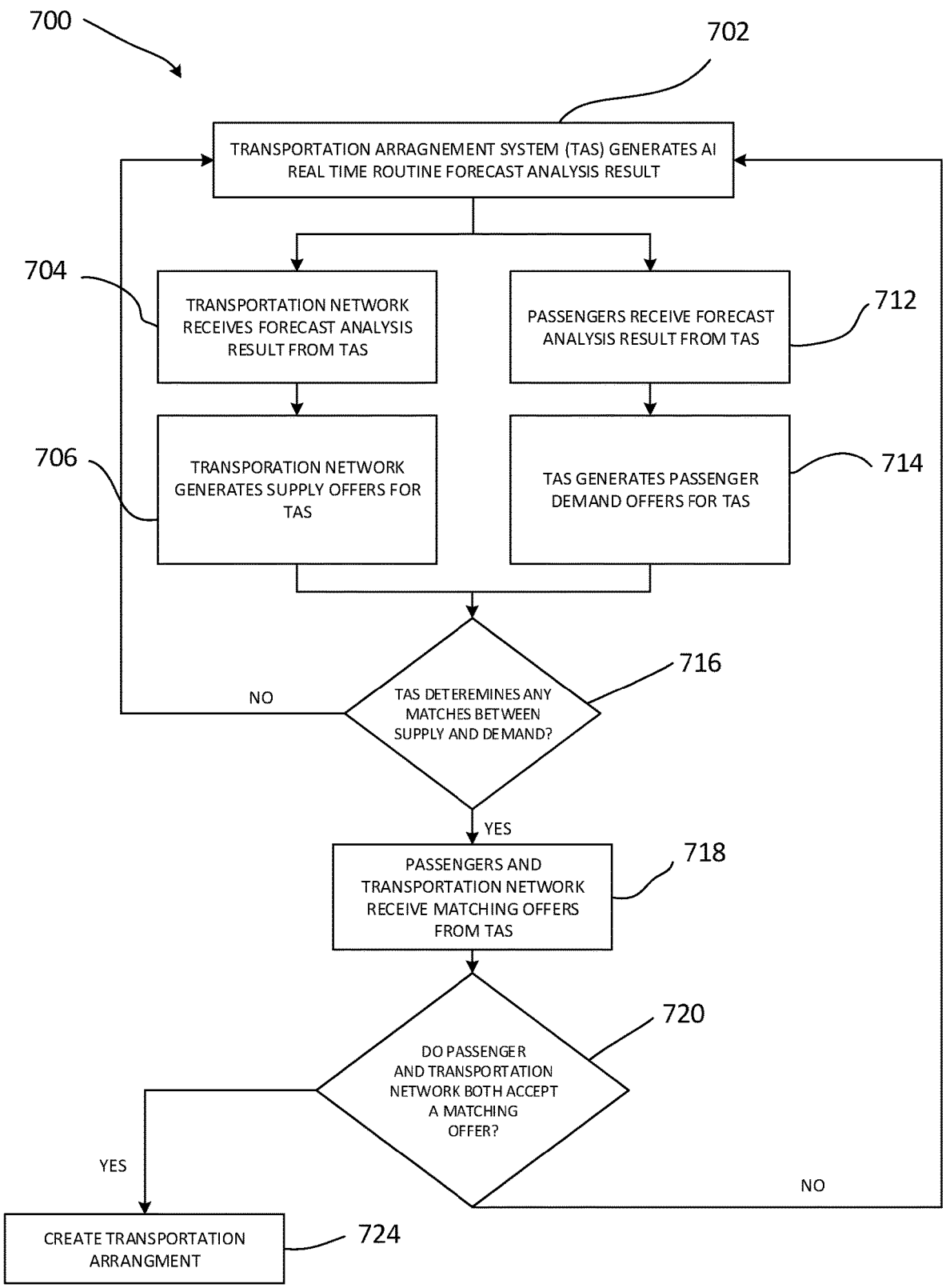
FIG. 7 is a block diagram of a method for arranging transportation between passengers and vehicles in a transportation network.

Referring now to FIG. 7, this figure is a block diagram showing a method for arranging transportation 700 between passengers and vehicles in a transportation network, according to certain embodiments. In step 702, the transportation arrangement system (TAS) generates a real time forecast analysis result that is based on the artificial intelligence and Big Data discussed above. This real time forecast analysis result includes information regarding the supply of driverless vehicles in the transportation network, and information regarding the predicted passenger demands for transportation (e.g., the estimated transportation system demand generated in step 418 of FIG. 4).

In step 704, the transportation network receives the real time forecast analysis result from the TAS. In step 706, the transportation network (e.g., a system directing or controlling a fleet of driverless vehicles) analyzes the real time forecast analysis result and the current supply of driverless vehicles, and then generates one or more supply offers. For example, if the transportation network determines that there are vehicles in the vicinity of a certain location at a certain time, and that there are one or more passengers that are predicted to have a transportation need in said place and time, then the transportation network generates one or more offers of transportation.

In certain embodiments, in step 712, the passengers also receive the real time forecast analysis result from the TAS. In one example, the passengers have mobile computing devices with an application installed thereon that receives and processes the real time forecast analysis result, and then displays certain results (e.g., a map of available vehicles) to the passengers. In other embodiments, the passengers do not receive these real time forecast analysis results.

In step 714, the TAS analyzes the real time forecast analysis result and the predicted demand of the passengers, and then generates one or more demand offers. In certain embodiments, these demand offers are based on the predicted travel needs of passengers.

In step 716, the TAS compares the supply offers received from the transportation network and the demand offers generated by the TAS, and determines whether there are any matches between the supply of vehicles and the predicted passenger demand. If there are no matches, then the process returns to step 702 and the process is repeated with an updated real time forecast analysis result. In this case, the TAS has determined that the current supply of driverless vehicles does not match any of the predicted passenger needs. If there are matches, then the process proceeds to step 718.

In step 718, in certain embodiments, the TAS presents the matching offers to both the passengers and the transportation network at the same time. In these embodiments, in step 720, if at least one of the passengers and the transportation network does not accept one of the matching offers, the process returns to step 702 and attempts to make new matches with an updated real time forecast analysis result. In step 720, if both the passenger and the transportation network accepts one of the matching offers, then the TAS creates a transportation arrangement between the passenger and one of the vehicles in the transportation network. In this case, there is a successful match between the current supply of vehicles in the transportation network and the current demands of the passengers.

In other embodiments, rather than presenting the matching offers to both the passengers and the transportation network at the same time, the TAS first presents the matching offer to just the passengers, and if a passenger accepts the matching offer, the matching offer is then presented to the transportation network. In these embodiments, the transportation network can then accept or decline the matching offer that has been previously accepted by the passenger.

In other embodiments, rather than presenting the matching offers to both the passengers and the transportation network at the same time, the TAS first presents the matching offer to just the transportation network, and if the transportation network accepts the matching offer, the matching offer is then presented to the passengers. In these embodiments, the passengers can then accept or decline the matching offer that has been previously accepted by the transportation network.

In certain embodiments, the passenger reviews the offer on a graphical user interface (e.g., a software application on a mobile computing device such as a smart phone), and provides input regarding whether to accept, modify or reject the offer. In certain embodiments, a software application provides the user with the ability to identify and communicate with other users in a similar location. For instance, in order to reduce the overall cost for transportation, the passenger may be able to share a ride with multiple other passengers. By ridesharing, all passengers are able to get from their origins to their destinations at a fraction of the cost. In certain embodiments, the passenger can interact with the mobile software application to view the locations of other passengers in the vicinity who were also requesting transportation to a similar destination, and the application allows the passengers to communicate with one another via text messaging (or some other form of group communication) in order to determine whether or not ridesharing is feasible. For example, a plurality of different potential passengers communicate in a group text message thread to determine whether two or more people can share the same vehicle. If the different passengers conclude that they would like to ride share, each of the passengers can accept a single offer of transportation from the transportation arrangement system. Therefore, the transportation arrangement system would know that multiple passengers will be sharing the same vehicle. In this situation, where multiple different passengers may be at slightly different origin locations, the transportation arrangement system can dictate a central location for different passengers so as to minimize total travel distance for all passengers to get to the departure destination. Alternatively, the multiple passengers can select a common meeting location, and provide this information to the transportation arrangement system and/or the transportation network. In certain embodiments, the transportation network receives the common meeting location from the multiple passengers, and then it can either accept this location or create an alternate meeting location.

In certain embodiments, a passenger provides information regarding at least one of a present location of the passenger, a desired destination, a maximum desired cost of the transportation, a maximum number of intermediate stops between the present location and the desired destination, a maximum number of other passengers that the passenger would be willing to travel with, and a maximum number of different vehicles that the passenger is willing to take to reach the destination.

In certain embodiments, where the passenger has indicated that they are willing to take multiple different vehicles to get to a desired destination (e.g., to minimize total costs or travel time), the transportation arrangement system presents an offer to the passenger that includes information regarding these multiple legs of the trip. In certain embodiments, the passenger would need to accept or reject the offer as a whole. In other embodiments, the passenger can accept only certain legs of the trip, and the transportation arrangement system would provide alternative driving options for the missing legs for the passenger's further review (i.e., to further accept or reject).

In certain embodiments, the present location of the passenger is automatically tracked with a GPS enabled device (e.g., the passenger's cellular phone) without requiring any input from the passenger. In certain embodiments, the passenger actively provides their present location to the AI system. In certain embodiments, the passenger sets a schedule of where they are likely to be at given times on given days of the week or month. In other embodiments, the AI system analyzes past travel information of the passenger to predict where they are likely to be at a given point in time. For example, if a passenger has a very consistent history of being at home at 7:00 am every Monday morning, and then travelling to work at that time, the AI system generates a prediction that the passenger will most likely be at home at 7:00 am on Mondays. In certain embodiments where the AI system generates a prediction of where the passenger will be at a given point in time, the passenger has the option of overriding the predicted location. For example, if the passenger is on vacation (i.e., not at home at 7:00 am on a Monday morning), the passenger can provide an update to the predicted present location with their actual present location. Also, as discussed above, in certain embodiments, the passengers have options to specify how much (or how little) personal information and travel history information they would like to share with the transportation arrangement system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for arranging transportation, the method comprising:
    applying one or more artificial intelligence (AI) models to a first set of data by one or more processors to predict transportation demands of a plurality of passengers, and creating a plurality of demand offers based on the predicted transportation demands;
    applying at least one of the AI models to a second set of data by the one or more processors to determine a supply of vehicles in a transportation system, and creating a plurality of supply offers based on the predicted transportation demands;

applying at least one of the AI models to compare the plurality of demand offers and the plurality of supply offers, and to determine a first match between a first one of the plurality of demand offers for a first passenger of the plurality of passengers and a first one of the plurality of supply offers, and to determine a second match between a second one of the plurality of demand offers for a second passenger of the plurality of passengers and the first one of the plurality of supply offers;

generating based on the determined first match, by the one or more processors, a transportation offer based on the predicted transportation demands of the first passenger and the supply of vehicles;

transmitting the transportation offer to the first passenger and the transportation system;

upon receiving an acceptance of the transportation offer by the first passenger, transmitting the transportation offer to the transportation system;

upon receipt of the transportation offer by the transportation system, accepting the transportation offer by the transportation system to create a transportation arrangement between the first passenger and the transportation system; and upon receiving a rejection of the transportation offer by the first passenger, transmitting the same transportation offer to the second passenger and the transportation system, wherein the generating and transmitting of the transportation offer are executed without a passenger request for transportation.

2. The method of claim 1, wherein the first set of data includes at least one of:
a current location of the plurality of passengers;
historic transportation data of the plurality of passengers;
a future schedule of the plurality of passengers; and
a time zone associated with the current location of the plurality of passengers.

3. The method of claim 2, wherein the historic transportation data of the plurality of passengers includes data on past trips, each past trip including at least an origin location, an origin departure time, a destination location, and a destination arrival time.

4. The method of claim 1, wherein the second set of data includes information regarding current locations of a plurality of vehicles in the transportation system.

5. The method of claim 1, further comprising enabling the plurality of passengers to override a destination location associated with the transportation offer prior to receiving an acceptance of the transportation offer.

6. The method of claim 1, wherein upon an acceptance of the transportation offer by more than one of the plurality of passengers and upon receiving a request from said passengers to share a vehicle, enabling the passengers to override an origin location of the transportation offer.

7. A computer system comprising:
a computer readable storage medium with program instructions stored thereon; and
one or more processors configured to execute the program instructions to perform a method for arranging transportation, the method comprising:
applying one or more artificial intelligence (AI) models to a first set of data by one or more processors to predict transportation demands of a plurality of passengers, and creating a plurality of demand offers based on the predicted transportation demands;

applying at least one of the AI models to a second set of data by the one or more processors to determine a supply of vehicles in a transportation system, and creating a plurality of supply offers based on the determined supply of vehicles;

applying at least one of the AI models to compare the plurality of demand offers and the plurality of supply offers, and to determine a first match between a first one of the plurality of demand offers for a first passenger of the plurality of passengers and a first one of the plurality of supply offers, and to determine a second match between a second one of the plurality of demand offers for a second passenger of the plurality of passengers and the first one of the plurality of supply offers;

generating based on the determined first match, by the one or more processors, a transportation offer based on the predicted transportation demands of the first passenger and the supply of vehicles;

transmitting the transportation offer to the first passenger and the transportation system;

upon receiving an acceptance of the transportation offer by the first passenger, transmitting the transportation offer to the transportation system;

upon receipt of the transportation offer by the transportation system, accepting the transportation offer by the transportation system to create a transportation arrangement between the first passenger and the transportation system; and upon receiving a rejection of the transportation offer by the first passenger, transmitting the same transportation offer to the second passenger and the transportation system, wherein the generating and transmitting of the transportation offer are executed without a passenger request for transportation.

8. The computer system of claim 7, wherein the first set of data includes at least one of:
a current location of the plurality of passengers;
historic transportation data of the plurality of passengers;
a future schedule of the plurality of passengers; and
a time zone associated with the current location of the plurality of passengers.

9. The computer system of claim 8, wherein the historic transportation data of the plurality of passengers includes data on past trips, each past trip including at least an origin location, an origin departure time, a destination location, and a destination arrival time.

10. The computer system of claim 7, wherein the second set of data includes information regarding current locations of a plurality of vehicles in the transportation system.

11. The computer system of claim 7, wherein the vehicles are automated driverless vehicles.

12. The computer system of claim 7, wherein upon an acceptance of the transportation offer by more than one of the plurality of passengers and upon receiving a request from said passengers to share a vehicle, enabling the passengers to override an origin location of the transportation offer.

13. A computer program product for implementing a method for arranging transportation, the computer program product comprising a computer readable storage medium having program instructions embodied therewith, the program instructions executable by at least one computer processor to cause the computer processor to:
apply one or more artificial intelligence (AI) models to a first set of data by one or more processors to predict transportation demands of a plurality of passengers, and creating a plurality of demand offers based on the predicted transportation demands;

apply one or more artificial intelligence (AI) models to a second set of data by the one or more processors to determine a supply of vehicles in a transportation system, and creating a plurality of supply offers based on the predicted transportation demands;

applying at least one of the AI models to compare the plurality of demand offers and the plurality of supply offers, and to determine a first match between a first one of the plurality of demand offers for a first passenger of the plurality of passengers and a first one of the plurality of supply offers, and to determine a second match between a second one of the plurality of demand offers for a second passenger of the plurality of passengers and the first one of the plurality of supply offers;

generate based on the determined first match, by the one or more processors, a transportation offer based on the predicted transportation demands of the first passenger and the supply of vehicles;

transmit the transportation offer to the first one of the passenger and the transportation system;

upon receiving an acceptance of the transportation offer by the first passenger, transmit the transportation offer to the transportation system;

upon receipt of the transportation offer by the transportation system, accept the transportation offer by the transportation system to create a transportation arrangement between the first passenger and the transportation system; and upon receiving a rejection of the transportation offer by the first passenger, transmitting the same transportation offer to the second passenger and the transportation system, wherein the generating and transmitting of the transportation offer are executed without a passenger request for transportation.

14. The computer program product of claim 13, wherein the first set of data includes at least one of:
 a current location of the plurality of passengers;
 historic transportation data of the plurality of passengers;
 a future schedule of the plurality of passengers; and
 a time zone associated with the current location of the plurality of passengers.

15. The computer program product of claim 14, wherein the historic transportation data of the plurality of passengers includes data on past trips, each past trip including at least an origin location, an origin departure time, a destination location, and a destination arrival time.

16. The computer program product of claim 13, wherein the vehicles are automated driverless vehicles.

* * * * *